United States Patent
Shinjo

(10) Patent No.: US 8,636,186 B2
(45) Date of Patent: Jan. 28, 2014

(54) APPARATUS FOR ALIGNED SUPPLY OF FASTENING PARTS

(75) Inventor: Hiroshi Shinjo, Osaka (JP)

(73) Assignee: Pias Sales Co., Ltd., Osaka (JP)

( * ) Notice: Subject to any disclaimer, the term of this patent is extended or adjusted under 35 U.S.C. 154(b) by 317 days.

(21) Appl. No.: 13/102,198

(22) Filed: May 6, 2011

(65) Prior Publication Data

US 2011/0297724 A1 Dec. 8, 2011

(30) Foreign Application Priority Data

May 6, 2010 (JP) .................................. 2010-106144

(51) Int. Cl.
*B23P 19/12* (2006.01)

(52) U.S. Cl.
USPC .............................. 227/118; 227/119; 29/798

(58) Field of Classification Search
USPC ............ 227/117, 118, 119, 120; 29/798, 818, 29/243, 53; 221/233
See application file for complete search history.

(56) References Cited

U.S. PATENT DOCUMENTS

| | | | |
|---|---|---|---|
| 3,466,730 A * | 9/1969 | Amtsberg et al. | 29/718 |
| 4,694,974 A * | 9/1987 | Heck et al. | 221/263 |
| 4,765,057 A * | 8/1988 | Muller | 29/716 |
| 6,357,109 B1 * | 3/2002 | Shinjo | 29/798 |

FOREIGN PATENT DOCUMENTS

DE 10035427 A1 * 4/2001 ............. B23P 19/00

* cited by examiner

*Primary Examiner* — Andrew M Tecco

(74) *Attorney, Agent, or Firm* — Antonelli, Terry, Stout & Kraus, LLP.

(57) ABSTRACT

An apparatus for aligned supply of fastening parts into an automatic assembling machine includes a rotary holding claw body, disposed at a lower position of a pressing punch, for gripping the fastening parts supplied in a position of a lateral direction by way of a supply passage, by passing through an intersection of an axial line of the pressing punch and an axial line of the supply passage, and rotating and displacing by a specific angle about a lateral axial line orthogonal to the both axial lines, and positioning and holding the fastening parts coaxially with the pressing punch at a lower position of the pressing punch. The rotary holding claw body has a pair of mutually opposing disk-shaped gripping claws, and the both disk-shaped gripping claws are forced to as to press push springs each other, and the fastening parts are gripped by the both disk-shaped gripping claws.

8 Claims, 16 Drawing Sheets

US 8,636,186 B2

APPARATUS FOR ALIGNED SUPPLY OF FASTENING PARTS

TECHNICAL FIELD

The present invention relates to an apparatus for aligned supply of fastening parts for supplying clinch bolts, headed screws, rivets, pins, and other various fastening parts having a head at one end of a shaft part, to an automatic assembling machine, for example, automatic crimping machine of clinch bolt, or automatic screwing machine of headed screw.

BACKGROUND ART

In a conventional apparatus for aligned supply of fastening parts of this type for aligning fastening parts in a longitudinal direction so that the shaft part is positioned in a vertical direction, and supplying coaxially at a lower position of a pressing punch or bit (extruding bar) of an automatic assembling machine, the overall height of the apparatus is increased, and in particular where the shaft part is too long, it may be difficult to assemble into the automatic assembling machine.

To solve such problems, an apparatus for aligned supply of fastening parts is disclosed in Patent Publication No. 3300688 (U.S. Pat. No. 6,357,109 B1) (patent document 1), in which fastening parts are aligned in a lateral direction so that the shaft part may be positioned in a horizontal direction and supplied continuously, and near a pressing punch of an automatic assembling machine, the fastening parts are gripped by a gripping claw provided in an inverting member, and inverted in a longitudinal direction so that the shaft part may be positioned in a vertical direction, and are moved laterally in a horizontal direction and supplied coaxially at a lower position of the pressing punch.

The apparatus for aligned supply disclosed in patent literature 1 can be lowered in the overall height of the apparatus, but requires two actions for inverting and transferring, and moving horizontally (moving laterally) the gripping claw of the fastening parts, and is hence limited in the supply capacity. Especially in the case of fastening parts longer in the shaft pat, there is a risk of contacting with the pressing punch when inverting and transferring the fastening parts by the gripping claw, and it was necessary to modify the layout of the gripping claw or change the entire apparatus configuration.

SUMMARY OF THE INVENTION

Problems to be Solved by the Invention

The present invention relates to an apparatus for aligning fastening parts in a lateral direction so that the shaft part may be positioned in the horizontal direction, and supplying continuously, similar to the apparatus disclosed in patent literature 1, and it is hence an object thereof to present an apparatus for aligned supply of fastening parts more compact in the entire configuration of the apparatus, capable of enhancing the supply capacity, and capable of handling fastening parts of a long shaft part without modifying the essential parts of the apparatus.

Means to Solve the Problems

To solve the above problems, the present invention is characterized by the following technical features.

A first embodiment of the invention relates to an apparatus for aligned supply of fastening parts for supplying fastening parts having a head part at one end of a shaft part, such as bolts, rivets, and pins, to an automatic assembling machine, including a pressing punch (extruding bar) moving up and down, a supply passage for supplying the fastening parts in a position of lateral direction with the shaft part leading end ahead and the head part behind, continuously from a lateral direction to a lower position of the pressing punch, and a rotary holding claw body disposed at a lower position of the pressing punch, for gripping the fastening parts supplied in a position of a lateral direction by way of the supply passage, passing through an intersection of an axial line of the pressing punch and an axial line of the supply passage, rotating and displacing by a specific angle about a lateral axial line orthogonal to the both axial lines, and positioning and holding the fastening parts coaxially with the pressing punch at a lower position of the pressing punch, in which the rotary holding claw body has a pair of mutually opposing disk-shaped gripping claws, the both disk-shaped gripping claws are forced to press each other by push springs, and the fastening parts are gripped by the both disk-shaped gripping claws, and when the pressing punch descends to press the head part of the fastening parts, the both disk-shaped gripping claws are pushed and expanded by resisting the push springs, and the fastening parts are extruded from the space between the both disk-shaped gripping claws.

A second embodiment of the invention relates to the apparatus for aligned supply of fastening parts of the first embodiment of the invention, in which a punch holder for mounting the pressing punch is provided with a guide post capable of moving up and down by a specific distance, with respect to the punch holder, being disposed in parallel to the pressing punch, a slide guide fixed on the guide post, and forced downward together with the guide post by spring means interposed with the punch holder, is provided with a through-hole moving up and down in which the pressing punch penetrates, and the supply passage, and the rotary holding claw body is assembled at an intersecting position of the through-hole and the supply passage, so as to be rotatable at a specific angle about the lateral axial line.

A third embodiment of the invention relates to the apparatus for aligned supply of fastening parts of the second embodiment of the invention, in which the pair of mutually opposing disk-shaped gripping claws of the rotary holding claw body are provided with shaft part gripping grooves of an arc-shaped section for engaging and gripping the shaft parts of the fastening parts on the mutually opposite sides, taper grooves expanding outward continuously to the end parts of the shaft part gripping grooves, and head part stopped step parts formed at the end parts of the taper grooves for stopping the head parts, and are further provided with stopper piece receiving concave parts extending parallel to the shaft part gripping grooves, and opened to the peripheral side surface and mutually contacting surfaces, and flange parts extending along the outer peripheral edges of the both disk-shaped gripping claws, and further accommodating holes of the push springs are provided in the center of the outer side of the both disk-shaped gripping claws, and the both disk-shaped gripping claws are provided with through-holes for working fluid penetrating and extending parallel to the lateral axial line, and on the other hand, mounting holes of the both disk-shaped gripping claws provided in the slide guide are orthogonal to the through-hole in which the pressing punch penetrates, with the lateral axial line provided in the center of rotation, and the mounting holes are composed of central circular holes sliding and bonding with the peripheral surface of the both mutually opposite disk-shaped gripping claws, and opening circular holes of a larger diameter than the central circular holes sliding and bonding with the outer circumference of the both flange parts, being disposed consecutively to both sides of the central circular hole, and when the both disk-shaped gripping claws are assembled in the mounting holes in the mutually opposite positions, the peripheral surfaces of the both disk-shaped gripping claws are rotatably supported on the central circular holes about the lateral axial line, the both flange parts are bonded to the opening circular holes slidably, and are stopped in step parts formed at the border of the central circular holes and the opening circular holes, and the both disk-shaped gripping claws are prevented from moving in the inward direction, but are allowed to move in the outward direction, and the both disk-shaped gripping claws are forced to push and contact with each other by the push springs inserted in the spring accommodating holes provided on the outside of the both disk-shaped gripping claws, and moreover stopper pieces are fitted movably and freely along the both stopper piece receiving concave parts, while working fluid contained in the both through-holes is driven and coupled to drive devices installed in the slide guide, so that the both disk-shaped gripping claws are rotated and displaced by a specific angle about the lateral axial line by the working shaft.

A fourth embodiment of the invention relates to the apparatus for aligned supply of fastening parts of the third embodiment of the invention, in which cut-off parts are provided in an angle range corresponding to rotation of the specific angle in the both flange parts of the both disk-shaped gripping claws, and when stopping pins inserted into the slide guide from a lateral direction are engaged with the cut-off parts, the both disk-shaped gripping claws are rotated and displaced correctly by the specific angle.

A fifth embodiment of the invention relates to the apparatus for aligned supply of fastening parts of the fourth embodiment of the invention, in which stopper pins inserted in the slide guide and protruding into the both opening circular holes of the mounting holes are engaged tightly with the outer side of the both flange parts of the both disk-shaped gripping claws to prevent the both disk-shaped gripping claws from moving to an outward direction, and when the stopper pins are opposite to the cut-off parts of the both flange parts, the both disk-shaped gripping claws are allowed to move to an outward direction.

A sixth embodiment of the invention relates to the apparatus for aligned supply of fastening parts of any one of the third embodiment of the invention, the fourth embodiment of the invention, and the fifth embodiment of the invention, in which the leading end part of the slide guide is provided with a notch passage in which the pressing punch is inserted from the extending portion of the supply passage and penetrates and opens through the through-hole moving up and down, and extends to an lower end opening, and when the shaft part of the fastening parts gripped by the both disk-shaped gripping claws is long, and protrudes from the shaft part gripping grooves, the protruding shaft part passes through the notch passage along with rotation and displacement of the both disk-shaped gripping claws, and is movable up to the lower end opening of the through-hole.

Advantage of the Invention

According to the present invention, in a position of a lateral direction with the shaft part leading end forward, and the head part behind, the fastening parts supplied through the supply passage are rotated and displaced, and at a lower position of the pressing punch, the rotary holding claw body for positioning and holding coaxially with the pressing punch is disposed closely to the lower position of the pressing punch, and is rotated and displaced by a specific angle about the axial line, and the essential parts of the apparatus for displacing and supplying the fastening parts from a position in a lateral direction to a position in a longitudinal direction can be composed in a very compact design. At the lower position of the pressing punch, the fastening parts can be positioned and held promptly and accurately, so that the supply capacity may be enhanced.

According to the second embodiment of the invention, the slide guide assembled in the punch holder for mounting the pressing punch movably up and down by way of the guide post is provided with the rotary holding claw body and the supply passage, and the entire apparatus can be designed in a compact structure while suppressing the overall height of the entire apparatus.

According to the third embodiment of the invention, the head part of the fastening parts gripped and held by the both disk-shaped gripping claws of the rotary holding claw body is pressed by the pressing punch, and the both disk-shaped gripping claws are pushed and opened, and in this state when pushing and sending out the fastening parts from the space between the both disk-shaped gripping claws, the stopper piece fitted freely and movably along the both stopper receiving concave parts blocks the front end opening of the supply passage, and the shaft part of the fastening parts to be supplied next will not invade into the expanded space between the both disk-shaped gripping claws, and the fastening parts can be supplied sequentially by separate each one securely.

According to the fourth embodiment of the invention, when the stopping pins are engaged with the cut-off parts provided in the both flange parts of the both disk-shaped gripping claws, the both disk-shaped gripping claws can be accurately rotated and displaced by a specific angle.

According to the fifth embodiment of the invention, when the fastening parts are inserted into the space between the both disk-shaped gripping claws from the supply passage, since the outward move of the both disk-shaped gripping claws is arrested by the stopper pins, the both disk-shaped gripping claws are prevented from being pushed and expanded by the head part of the fastening parts, and on the other hand, when the both disk-shaped gripping claws gripping the fastening parts are rotated and displaced by a specific angle and the stopper pins are opposite to the cut-off parts provided in the flanges parts, outward move of the both disk-shaped gripping claws is allowed, and when the head part is pressed by the pressing punch, the both disk-shaped gripping claws are pushed and expanded by resisting the push springs, so that there is no problem in rotation, displacement or supply of fastening parts.

According to the sixth embodiment of the invention, if the shaft part of the fastening parts is long, and when gripped by the both disk-shaped gripping claws, if the shaft part protrudes and projects from the shaft part gripping grooves, the protruding shaft part moves to the lower end opening of the through-hole by way of the notch passage provided at the front end part of the slide guide along with rotation and displacement of the both disk-shaped gripping claws, and even if the shaft part of the fastening parts is long, a smooth supply is realized without changing the entire apparatus configuration.

MODE FOR CARRYING OUT THE INVENTION

A preferred embodiment of the present invention is described specifically below by referring to the accompanying drawings.

Figure 6:
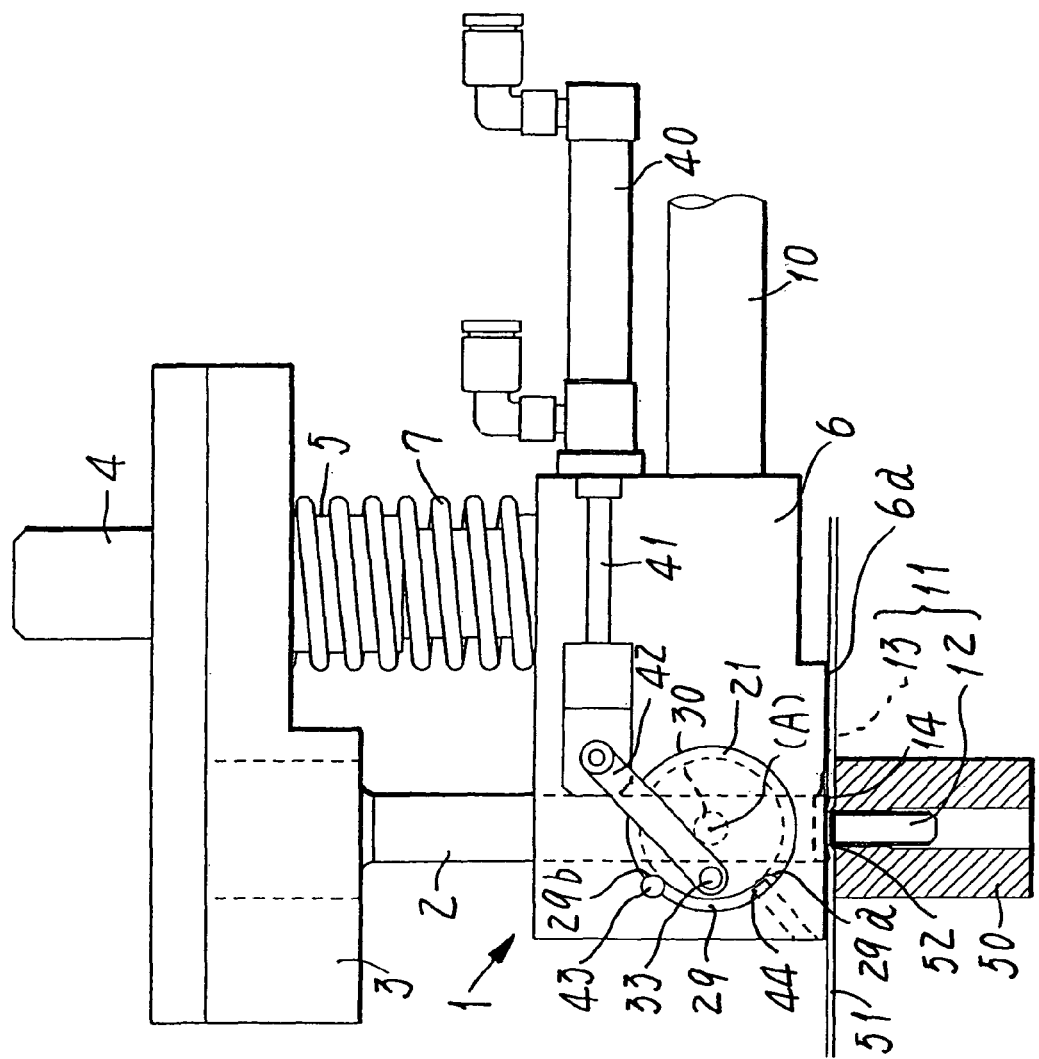
FIG. 6 is a partially cut-away front view of the same apparatus for aligned supply, showing a process of pressing the fastening parts gripped in a position of a longitudinal direction to the rotary holding claw body by a pressing punch, and extruding from the rotary holding claw body, and affixing to a metallic panel.

The drawing shows a preferred embodiment of an apparatus for aligned supply of fastening parts of the present invention applied to an automatic crimping machine for aligning and supplying clinch bolts 11 (see FIG. 3), and affixing on a metallic panel 51 (see FIG. 6). The apparatus 1 for aligned supply shown in FIG. 1 is mounted on a ram of a press (not shown) of an automatic crimping machine, and is used at a position opposite to a crimping die 50 (see FIG. 6) of the press.

Figure 1:
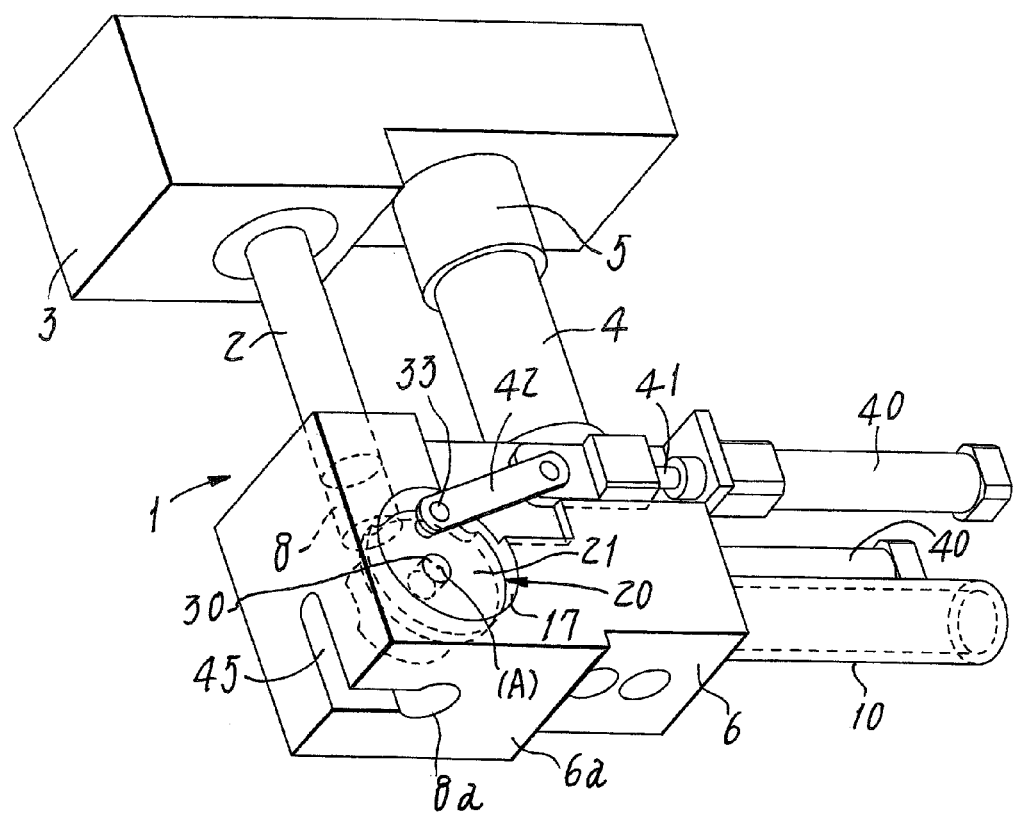
FIG. 1 is a partially cut-away perspective view showing an apparatus for aligned supply of fastening parts according to the present invention.
Figure 2:
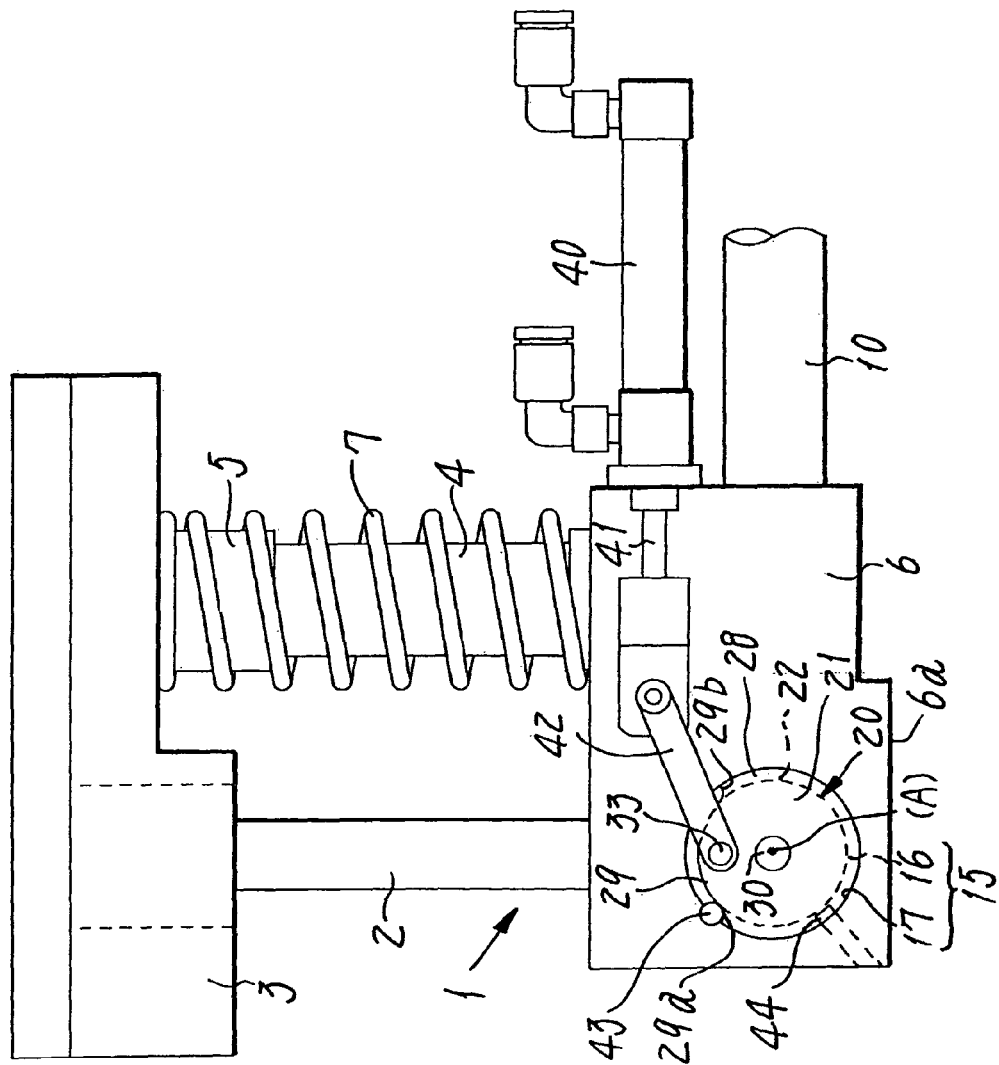
FIG. 2 is a partially cut-away front view of the same apparatus for aligned supply, showing a state of fastening parts supplied on a rotary holding claw body in a position of a lateral direction.
Figure 3:
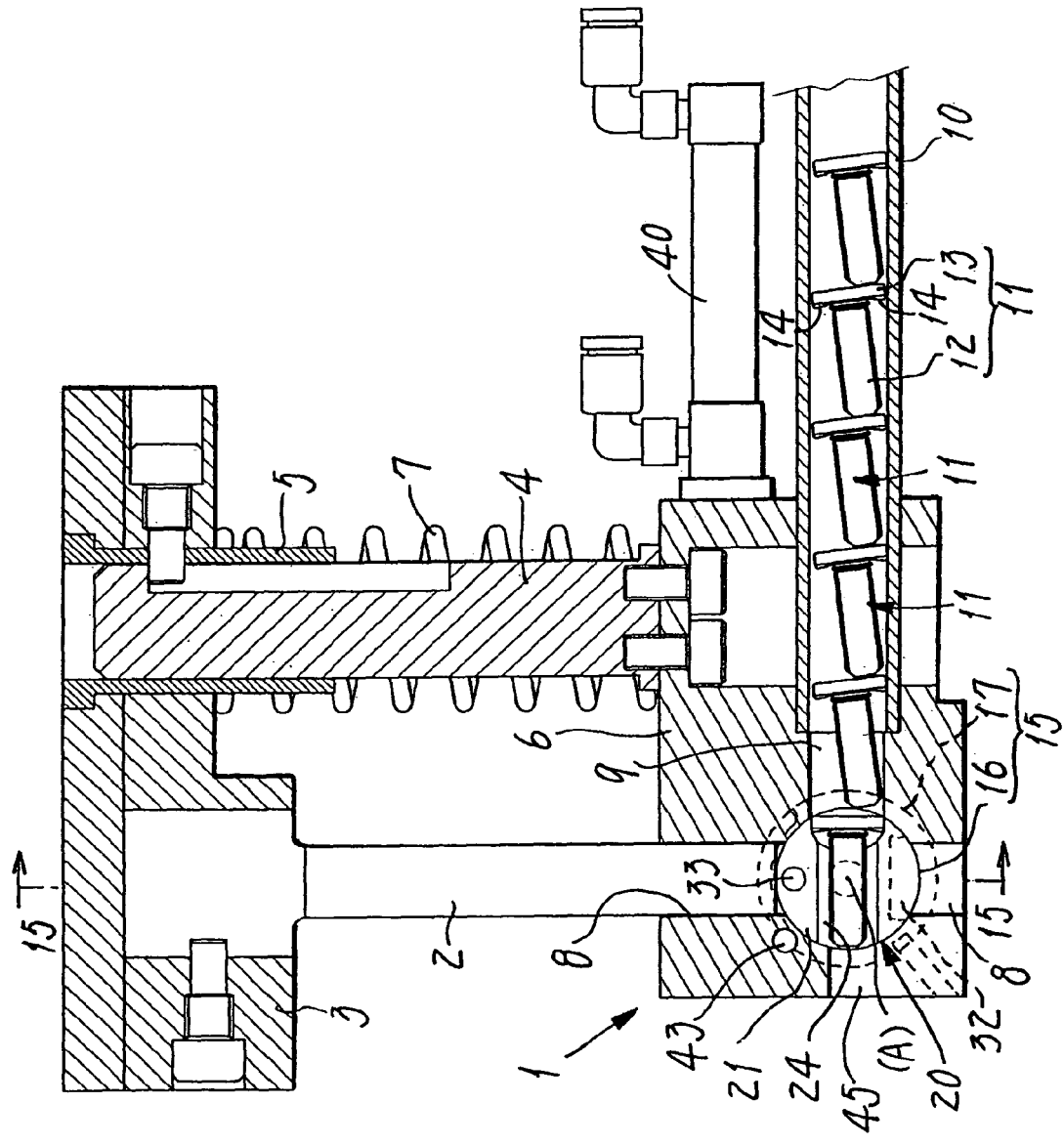
FIG. 3 is a front view of a longitudinal section of essential parts.

FIG. 1 to FIG. 3 show a state of a rotary holding claw body 20 (described below) for composing a principal part of the apparatus 1 for aligned supply of the present invention, at a waiting position before rotation and displacing by gripping the clinch bolts 11 as fastening parts. The apparatus 1 for aligned supply has a pressing punch 2, and a punch holder 3 for mounting the pressing punch 2 is fixed on a press ram not shown, and the pressing punch 2 moves up ad down in a vertical direction in cooperation with the press ram. The punch holder 3 is provided with a guide post 4 disposed in parallel to the pressing punch 2, assembled in a state capable of moving up and down by a specific distance to the punch holder 3 by way of the guide sleeve 5. At the lower end of the guide post 4, a slide guide 6 for assembling a rotary holding claw body 20 is mounted and fixed. The slide guide 6 is fitted to the guide post 4, and is forced downward together with the guide post 4 by means of a coil spring 7 interposed against the punch holder 3. The slide guide 6 is provided with a through-hole 8 in which the pressing punch 2 is inserted and is moved up and down, and a supply passage 9 penetrating orthogonally to the through-hole 8, and extending in a lateral direction, and at an intersecting position of the through-hole 8 and the supply passage 9, the rotary holding claw body 20 is assembled to pass the intersection of an axial line of the pressing punch 2 or the through-hole 8, and an axial line of the supply passage 9, as described below, so as to be rotatable by a specific angle (90 degrees in the preferred embodiment) about the lateral axial line (A) orthogonal to the both axial lines In the supply passage 9, a bolt supply hose 10 is connected, and a multiplicity of clinch bolts 11 are supplied continuously in the supply passage 9 in a position of a lateral direction, that is, in a position of a lateral direction with the leading end of a screw shaft part 12 ahead, and a head part 13 provided at the rear end of the screw shaft part 12 behind. On the seat surface of the head part 13 of the clinch bolt 11, a crimping protrusion 14 (see FIG. 3) is provided integrally. The slide guide 6 is provided with a mounting hole 15 for assembling the rotary holding claw body 20 at an intersecting position of the through-hole 8 and the supply passage 9. The mounting hole 15 is specifically shown in FIG. 15, and is composed of a central circular hole 16, and opening circular holes 17, 17 of a larger diameter than the central circular hole 16, provided consecutively to both sides of the central circular hole 16, and step parts 18, 18 are formed on the border of the central circular hole 16 and the opening circular holes 17, 17 (see FIG. 15). On the outer side of the both opening circular holes 17, 17, lid plates 19, 19 are provided detachably. In FIG. 1 to FIG. 3, the lid plates 19 are shown in a removed state.

FIG. 8 to FIG. 14 show the rotary holding claw body 20 and its component parts. The rotary holding claw body 20 has a pair of mutually opposite disk-shaped gripping claws 21, 21. Each disk-shaped gripping claw 21 is specifically shown in FIG. 8 to FIG. 11, and is provided with a shaft part gripping groove 24 of an arc-shaped section for engaging and gripping the screw shaft part 12 of the clinch bolt 11, which is a fastening part, on an opposite surface 23 of a disk-shaped main body 22, a taper groove 25 expanding outward consecutively to one end of the shaft part gripping groove 24, and a head part stopping step part 26 formed at an end part of the taper groove 25 for stopping the head part 13. The disk-shaped main body 22 is provided with a stopper piece receiving concave part 27 extending in parallel to the shaft part gripping groove 24, and opening at the peripheral side and the opposite surface 23, and a flange part 28 extending along the outer peripheral edge. The flange part 28 has a cut-off part 29 extending in the peripheral direction in a range of a specific angle (90 degrees) so that the disk-shaped gripping claw 21 may correspond to rotation and displacement of a specific angle (90 degrees in the preferred embodiment) as described below. Moreover, in the middle of the outer side of the disk-shaped main body 22, a spring accommodating hole 30 for a push spring 34 (see FIG. 15) is provided, and an insertion hole 31 of a working shaft 33 (see FIG. 1 to FIG. 3) penetrating through the disk-shaped main body 22 is provided in parallel to the rotation central line at a position close to the cut-off part 29.

Figure 12:
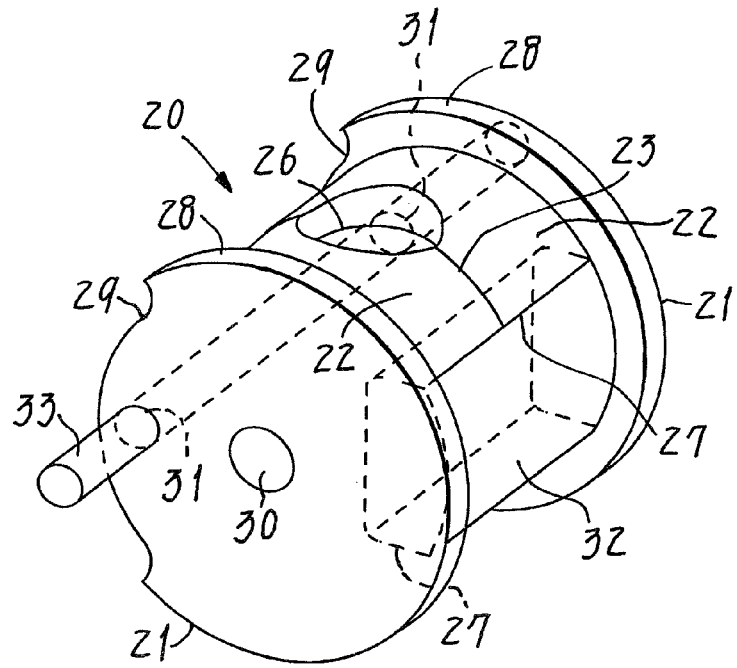
FIG. 12 is a perspective view of a rotary holding claw body composed by assembling a pair of disk-shaped gripping claws oppositely to each other.
Figure 13:
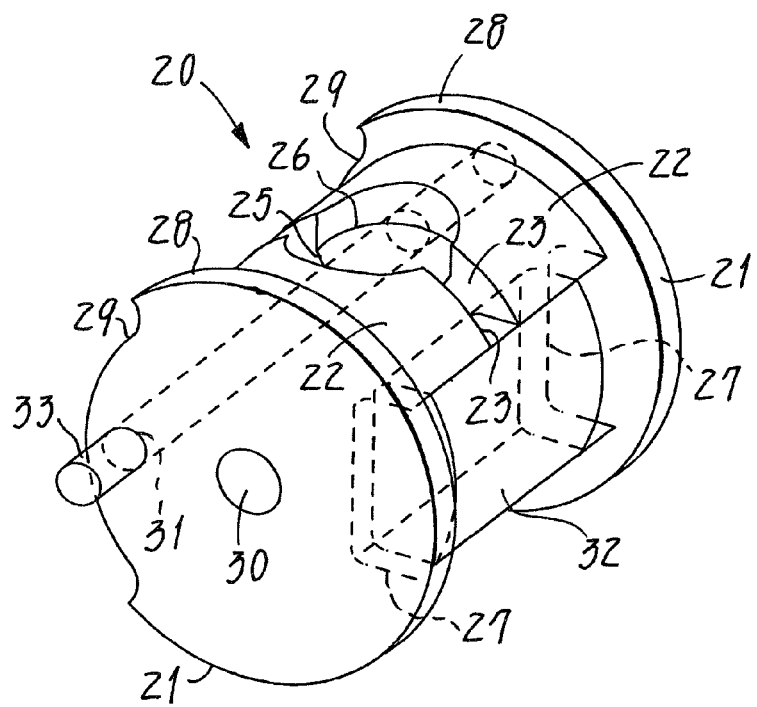
FIG. 13 is a perspective view showing an opened state of the both disk-shaped gripping claws of the same rotary holding claw body.
Figure 14:
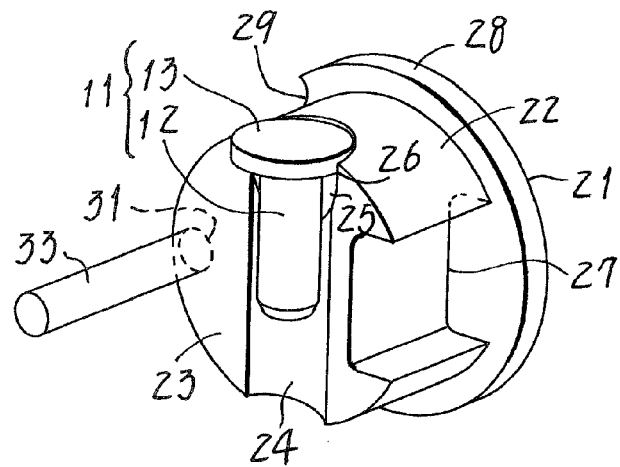
FIG. 14 is a perspective view showing an engaged state of the fastening parts in the same disk-shaped gripping claws at a position for gripping the fastening parts.
Figure 15:
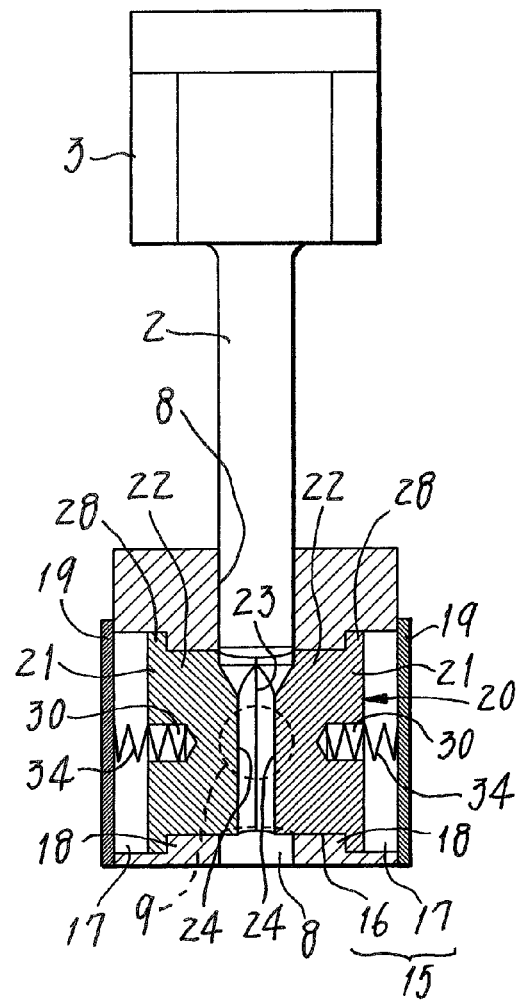
FIG. 15 is an arrow sectional view along line 15-15 in FIG. 3.
Figure 16:
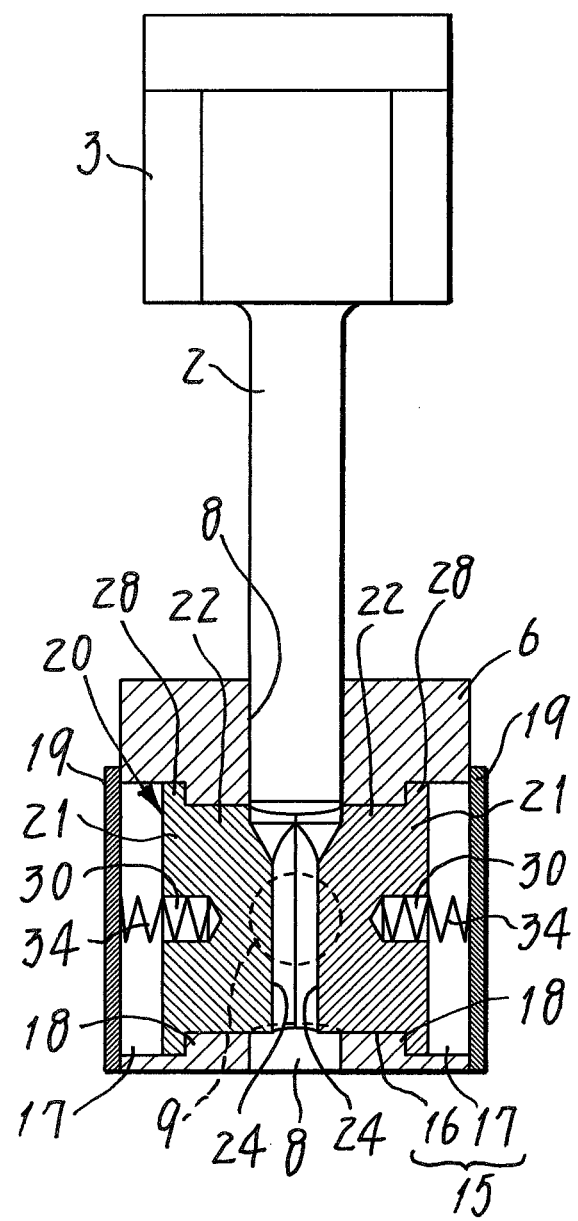
FIG. 16 is an arrow sectional view along line 16-16 in FIG. 5.

The pair of disk-shaped gripping claws 21, 21 having such shape are opposite to the opposite surfaces 23, 23 as shown in FIG. 12, and the stopper piece 32 is freely fitted along the both stopper piece receiving concave parts 27, 27, and the working shaft 33 is inserted into the both insertion holes 31, 31 in an assembled state, and assembled into the mounting hole 15 of the slide guide 6 as shown in FIG. 1 to FIG. 3 and FIG. 15, and the rotary holding claw body 20 is composed. In other words, the both disk-shaped gripping claws 21, 21 assembled in the mounting hole 15 in a mutually opposite state have the peripheral sides of the disk-shaped main bodies 22, 22 sliding and fitting in the central circular hole 16 of the mounting hole 15, and both outer circumferential sides of the both flange parts 28, 28 sliding and fitting in the opening circular holes 17, 17, so that the both disk-shaped gripping claws 21, 21 are supported rotatably about the axial line (A) mentioned above. The both disk-shaped gripping claws 21, 21 supported in this manner are forced to press the opposite surfaces 23, 23 to each other by push springs 34, 34 fitted to the spring accommodating holes 30, 30 as shown in FIG. 15, and the flange parts 28, 28 are stopped at the step parts 18,18 of the mounting hole 15 and are prevented from moving to the inward direction, but are allowed to be movable to the outward direction by resisting the push springs 34, 34, and the both disk-shaped gripping claws 21, 21 are pushed and expanded by resisting the push springs 34, 34. Further, as shown in FIG. 13, when the both disk-shaped gripping claws 21, 21 pushed and expanded, the stopper piece 32 maintains a state of being freely engaged along the both stopper piece receiving concave parts 27, 27. This stopper piece 32, as mentioned below, prevents the screw shaft part 12 of the clinch bolt 11 to be supplied next, from invading into the expanded space between the both disk-shaped gripping claws 21, 21, when extruding the clinch bolt 11 gripped by the rotary holding claw body 20 by pushing and expanding the both disk-shaped gripping claws 21, 21, so that the clinch bolts 11 may be separated securely by each piece, and may be supplied sequentially.

The both ends of the working shaft 33 inserted into the insertion holes 31,31 of the both disk-shaped gripping claws 21, 21 assembled in the slide guide 6 in this manner are interlocked and coupled, as shown in FIG. 1 and FIG. 2, by way of links 42, 42, to rods 41, 41 of air cylinders 40, 40 mounted at both sides of the rear end part of the slide guide 6, and by the working shaft 33 moved reciprocally by the air cylinders 40, 40, the both disk-shaped gripping claws 21, 21 are rotated and displaced by moving reciprocally by a specified angle (90 degrees) about the lateral axial line (A). On the other hand, stopping pins 43, 43 inserted from both sides of the slide guide 6 are engaged with the cut-off parts 29, 29 provided in the flange parts 28, 28 of the both disk-shaped gripping claws 21, 21, so that the both disk-shaped gripping claws 21, 21 may be rotated and displaced accurately by a specific angle (90 degrees).

Figure 20:
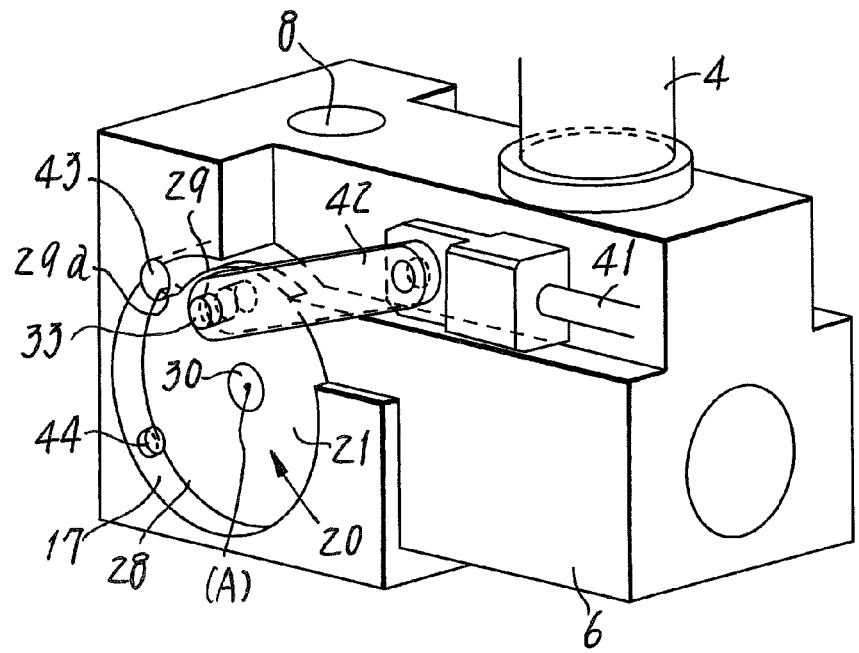
FIG. 20 is a perspective view of essential parts of the apparatus showing a closed state of the both disk-shaped gripping claws of the rotary holding claw body.
Figure 21:
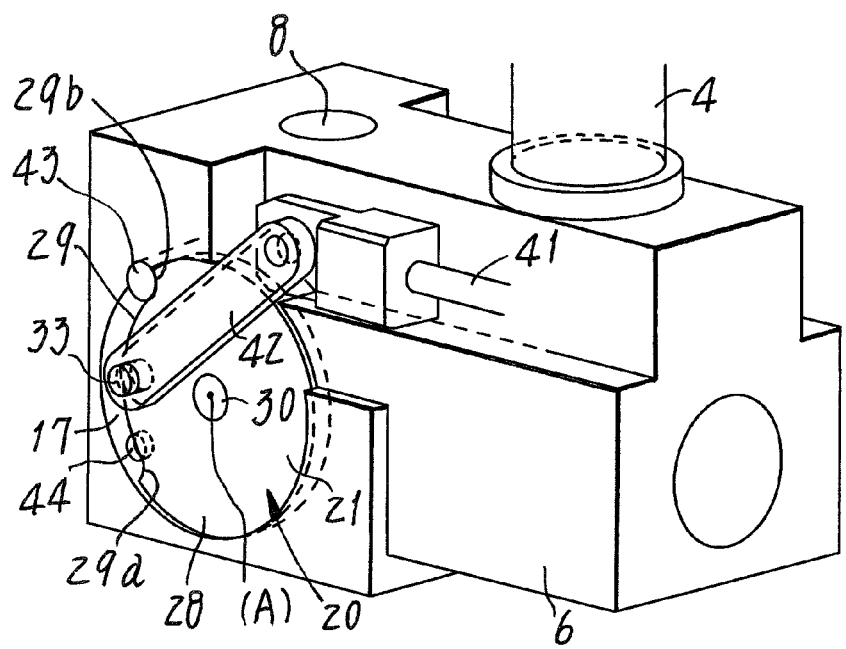
FIG. 21 is a perspective view of essential parts of the apparatus showing an opened state of the both disk-shaped gripping claws of the rotary holding claw body.

Moreover, as specifically shown in FIG. 20 and FIG. 21, stopper pins 44, 44 protruded to the both opening circular holes 17, 17 of the mounting hole 15 as being inserted into the both sides of the front end part of the slide guide 6 abut and engage with the outer sides of the both flange parts 28, 28 of the both disk-shaped gripping claws 21, 21, and the both disk-shaped gripping claws 21, 21 are prevented from moving to the outward direction (FIG. 20), while the both disk-shaped gripping claws 21, 21 are rotated and displaced by a specific angle, and when the stopper pins 44, 44 are opposite to the cut-off parts 29, 29 provided in the flange parts 28, 28, the both disk-shaped gripping claws 21, 21 are allowed to move to the outward direction (FIG. 21).

The next explanation is about the working process of aligned supply of clinch bolts 11 as fastening parts by the apparatus 1 for aligned supply having the above configuration.

In FIG. 1 to FIG. 3, the both disk-shaped gripping claws 21, 21 of the rotary holding claw body 20 are at a waiting position before rotating and displacing by a specific angle (90 degrees) by gripping the clinch bolts 11. The clinch bolts 11 supplied through supply passage 9 are inserted into the shaft part gripping grooves 24, 24 of the both disk-shaped gripping claws 21, 21 mutually opposite to the screw shaft part 12, and the head part 13 is stopped on the head part stopping step parts 26, 26, and is held on the rotary holding claw body 20 in a position of a lateral direction. At this time, the stopping pins 43, 43 are engaged with end parts 29a, 29a at one side of the cut-off parts 29, 29 of the both disk-shaped gripping claws 21, 21. The stopper pins 44, 44 are engaged in contact with the outer circumference of the both flange parts 28, 28 of the both disk-shaped gripping claws 21, 21, thereby preventing the both disk-shaped gripping claws 21, 21 from moving to the outward direction (see FIG. 20). Therefore, the head part 13 of the clinch bolts 11 held between the both disk-shaped gripping claws 21, 21 are pushed by force by the succeeding clinch bolts 11, and the both disk-shaped gripping claws 21, 21 are prevented from being pushed and expanded, and the clinch bolts 11 supplied continuously through the supply passage 9 are securely separated one by one, and are gripped by the both disk-shaped gripping claws 21, 21.

Figure 4:
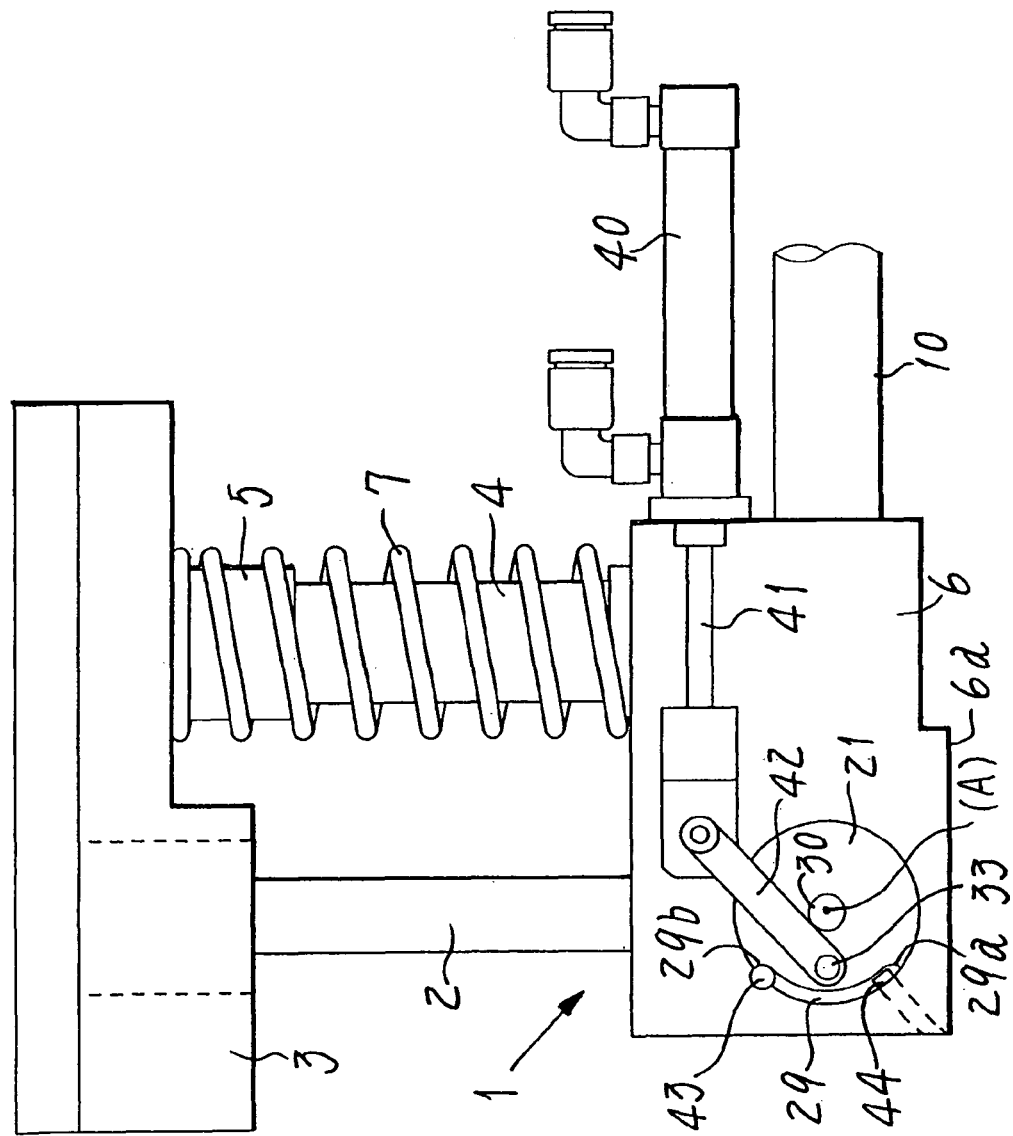
FIG. 4 is a partially cut-away front view of the same apparatus for aligned supply, showing a state of a rotary holding claw body provided with fastening parts being rotated and displaced by a specific angle (90 degrees), so that the fastening parts are displaced in a position of a longitudinal direction.
Figure 5:
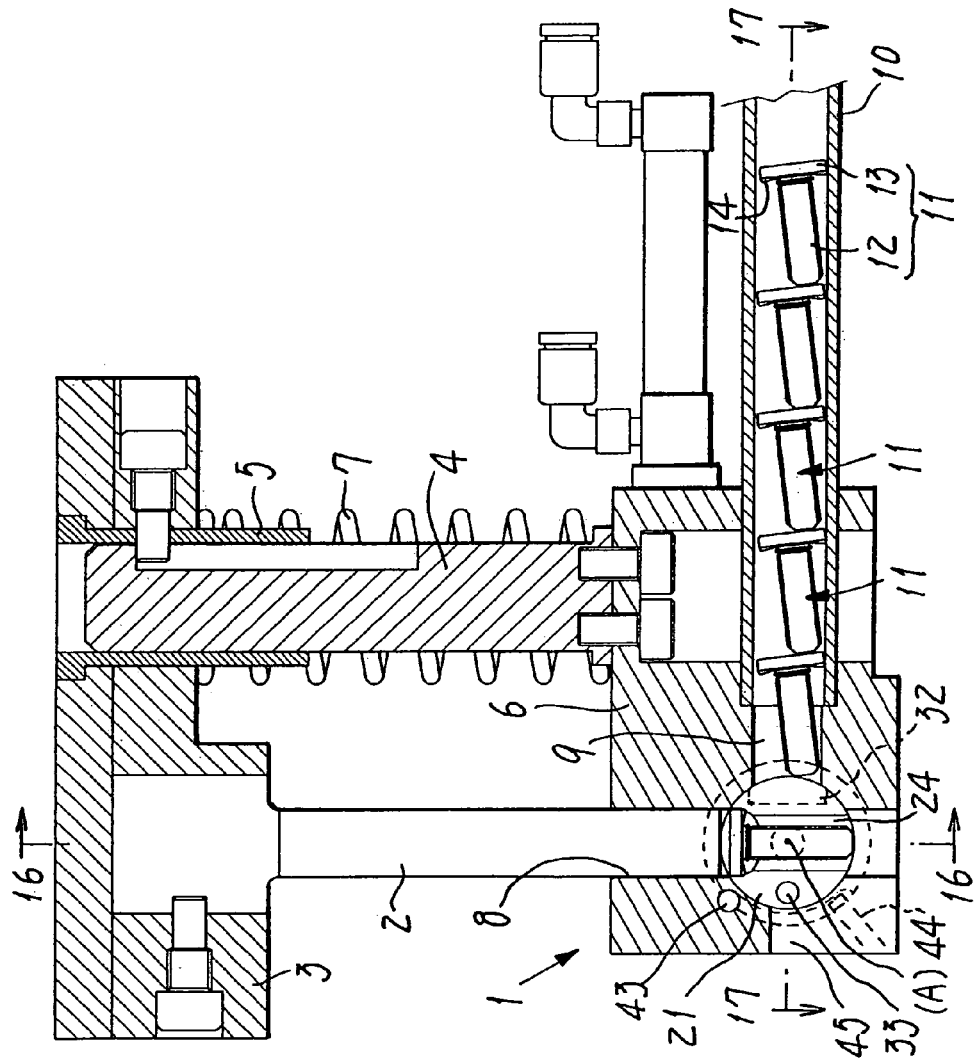
FIG. 5 is a front view of a longitudinal section of essential parts of FIG. 4.
Figure 17:
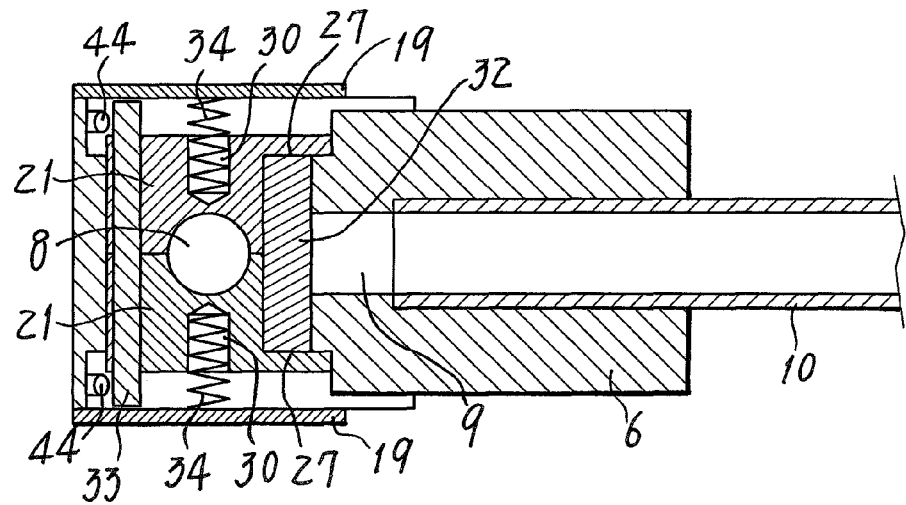
FIG. 17 is an arrow sectional view along line 17-17 in FIG. 5.

Further, as shown in FIG. 4 and FIG. 5, the air cylinders 40, 40 are operated, and the rods 41, 41 are moved forward. By the forward move of the rods 41, 41, the working shaft 33 is pushed by way of the links 42, 42, and the both disk-shaped gripping claws 21, 21 are rotated and displaced by a specific angle (90 degrees) about the lateral axial line (A). Along with this rotation and displacement, the shaft part gripping grooves 24, 24 of the both disk-shaped gripping claws 21, 21 become coaxial with the axial line of the pressing punch 2, and the clinch bolts 11 gripped on the both disk-shaped gripping claws 21, 21 are positioned coaxially at a lower position of the pressing punch. In this manner, when the both disk-shaped gripping claws 21, 21 are rotated and displaced, the stopping pins 43, 43 are engaged with the other end parts 29b, 29b of the cut-off parts 29, 29, and the rotation and displacement is determined accurately at a specific angle (90 degrees). By this rotation and displacement, the both stopper pins 44, 44 are opposite to the cut-off parts 29, 29, and the both disk-shaped gripping claws 21, 21 are allowed to be movable to the outward direction (see FIG. 21). Moreover, the stopper piece 32 is positioned to block the front end opening of the supply passage 9 (see FIG. 5 and FIG. 17).

Figure 7:
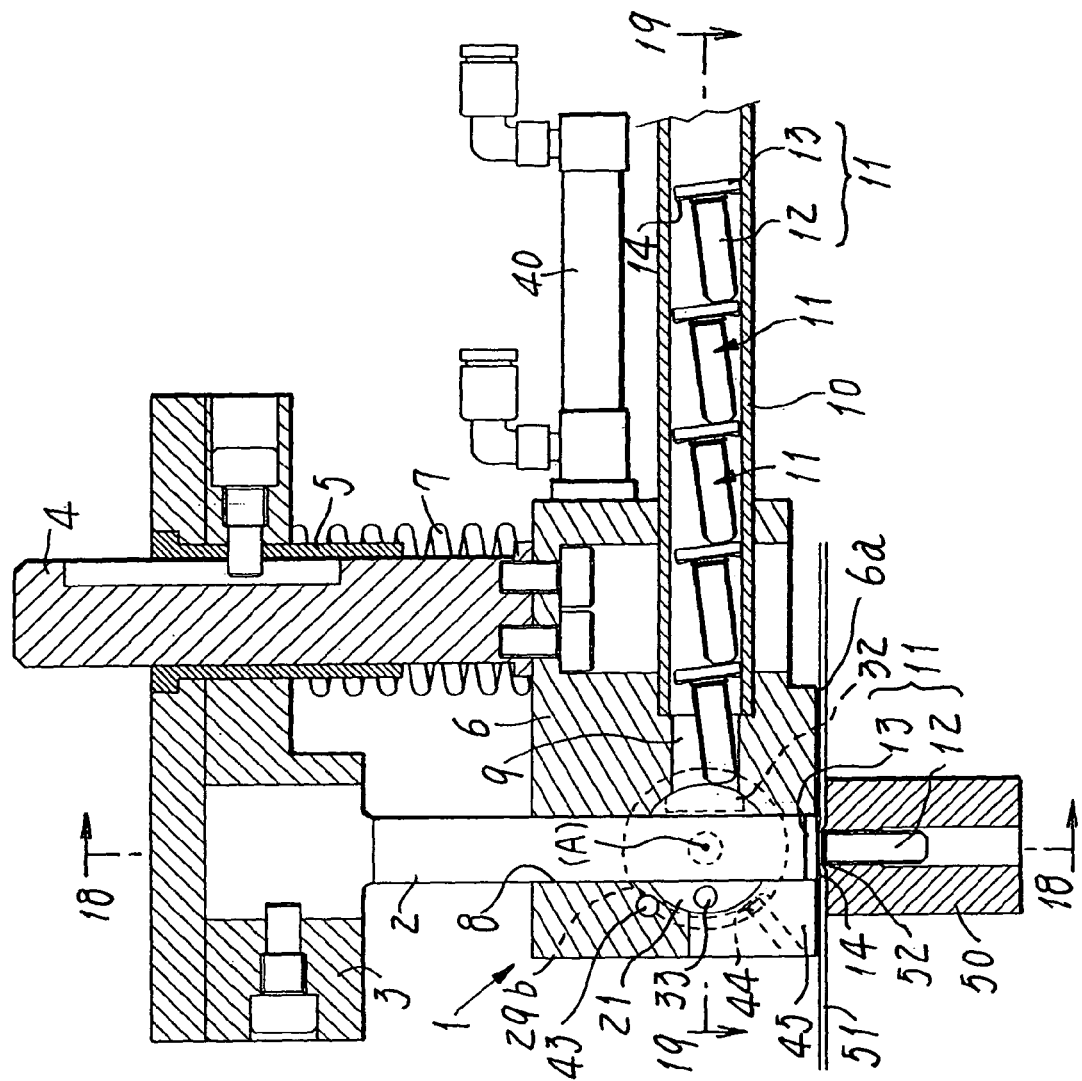
FIG. 7 is a front view of a longitudinal section of essential parts of FIG. 6.
Figure 8:
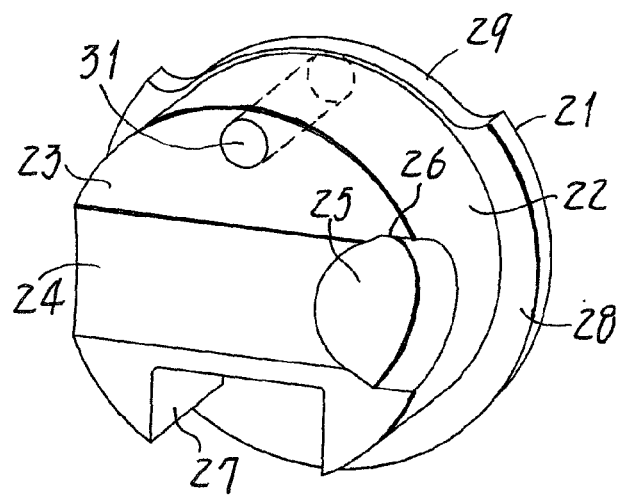
FIG. 8 is a perspective view of a disk-shaped gripping claw as an essential component of the rotary holding claw body.
Figure 9:
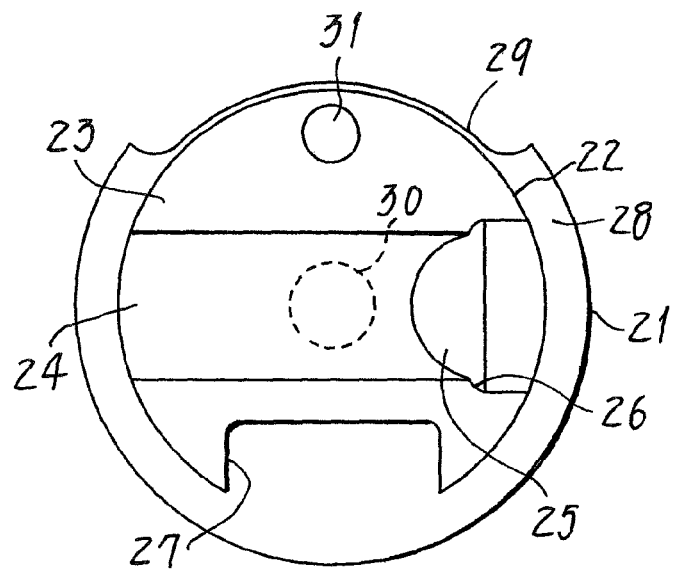
FIG. 9 is a front view of the same disk-shaped gripping claw.
Figure 10:
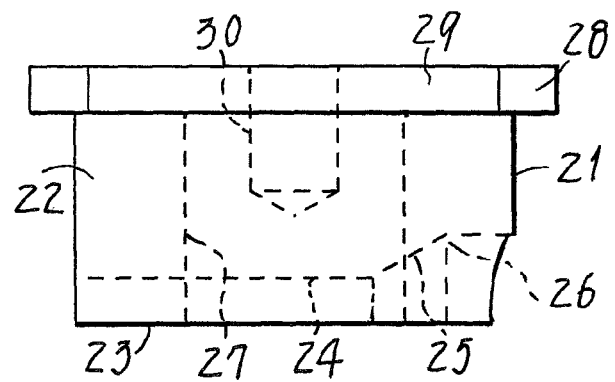
FIG. 10 is a plan view of the same disk-shaped gripping claw.
Figure 11:
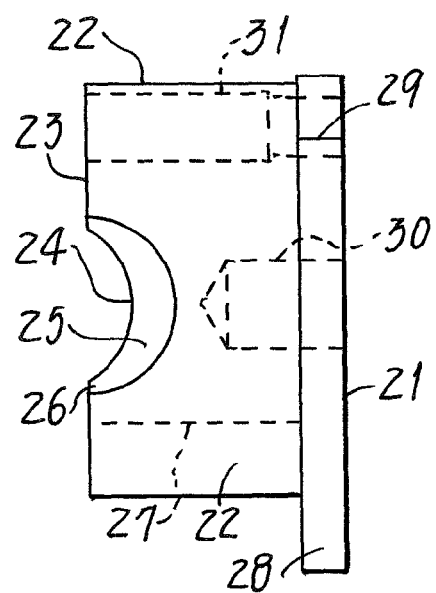
FIG. 11 is a side view of the same disk-shaped gripping claw.
Figure 18:
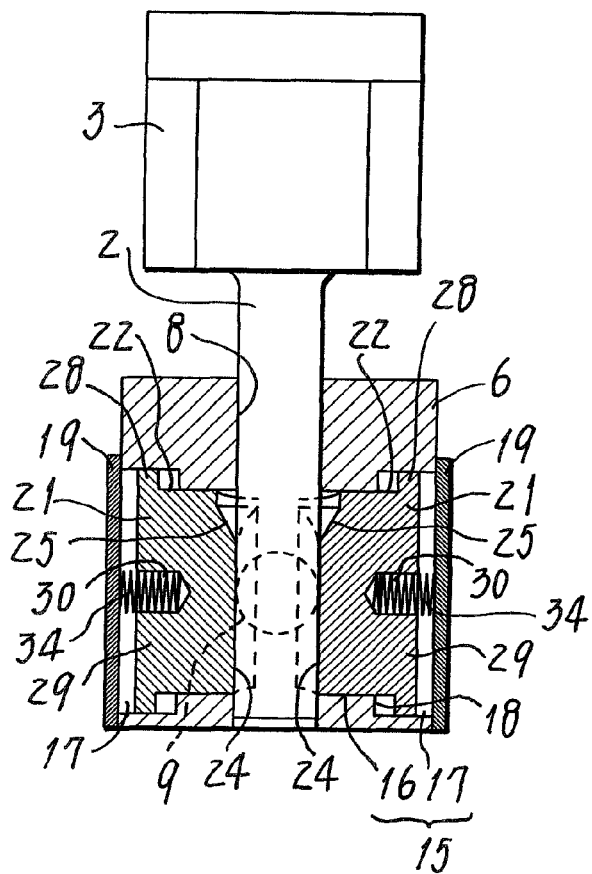
FIG. 18 is an arrow sectional view along line 18-18 in FIG. 7.
Figure 19:
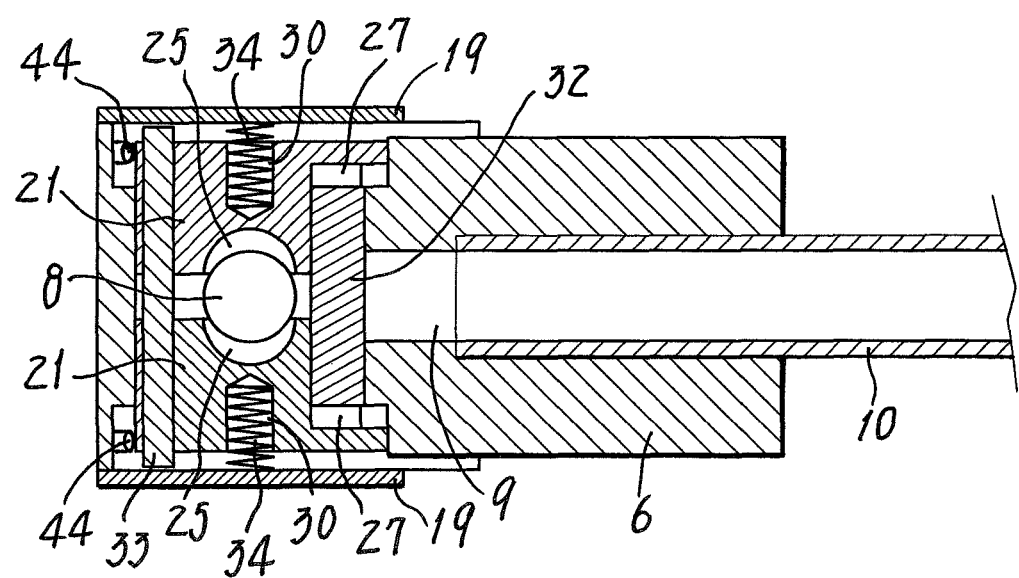
FIG. 19 is an arrow sectional view along line 19-19 in FIG. 7.

In this state, when the punch holder 3 and the pressing punch 2 descend in cooperation with the press ram not shown, the slide guide 6 is also pulled down by way of the coil spring 7, and when the lower end face 6a of the descending slide guide 6 stops by abutting against a metallic panel 51 mounted on a die 50, the metallic panel 51 is pressed by the side guide 6 by the spring pressure of the coil spring 7, and is supported on the die 50. When the pressing punch 2 further descends, and presses the head part 13 of the clinch bolts 11 gripped by the both disk-shaped gripping claws 21, 21, by this pressing force, the both disk-shaped gripping claws 21, 21 are pushed and expanded by resisting the both push springs 34, 34 (see FIG. 18, FIG. 19). As a result, the clinch bolts 11 are pushed out from the space between the both disk-shaped gripping claws 21, 21, and as shown in FIG. 6 and FIG. 7, the screw shaft part 12 of the clinch bolts 11 is inserted into a passing hole 52 preliminarily processed in the metallic panel 51, and the crimping protrusion 14 provided on the seat surface of the head part 13 crimps and deforms the peripheral edge portion of the passing hole 52, so that the clinch bolts 11 are crimped and bonded to the metallic panel 51.

In this manner, when the clinch bolts 11 are affixed on the metallic panel 51, the punch holder 3 and the pressing punch 2 ascend in cooperation with the press ram not shown, and the air cylinders 40, 40 are operated, and the rods 41, 41 are moved backward. In cooperation with this backward move of the rods 41, 41, the working shaft 3 is pulled back by way of the links 42, 42, and the both disk-shaped gripping claws 21, 21 come back to the waiting position shown in FIG. 1 to FIG. 3. At this time, the slide guide 6 also returns to the waiting position. In succession, the screw shaft part 12 of the next clinch bolt 11 positioned at the foremost position of the supply passage 9 is inserted into the shaft part gripping grooves 24, 24 of the both disk-shaped gripping claws 21, 21, thereby coming in a waiting state. Hereinafter, the same operation is repeated, and the clinch bolts 11 supplied continuously through the supply passage 9 are separate one by one, and supplied in alignment.

Figure 22:
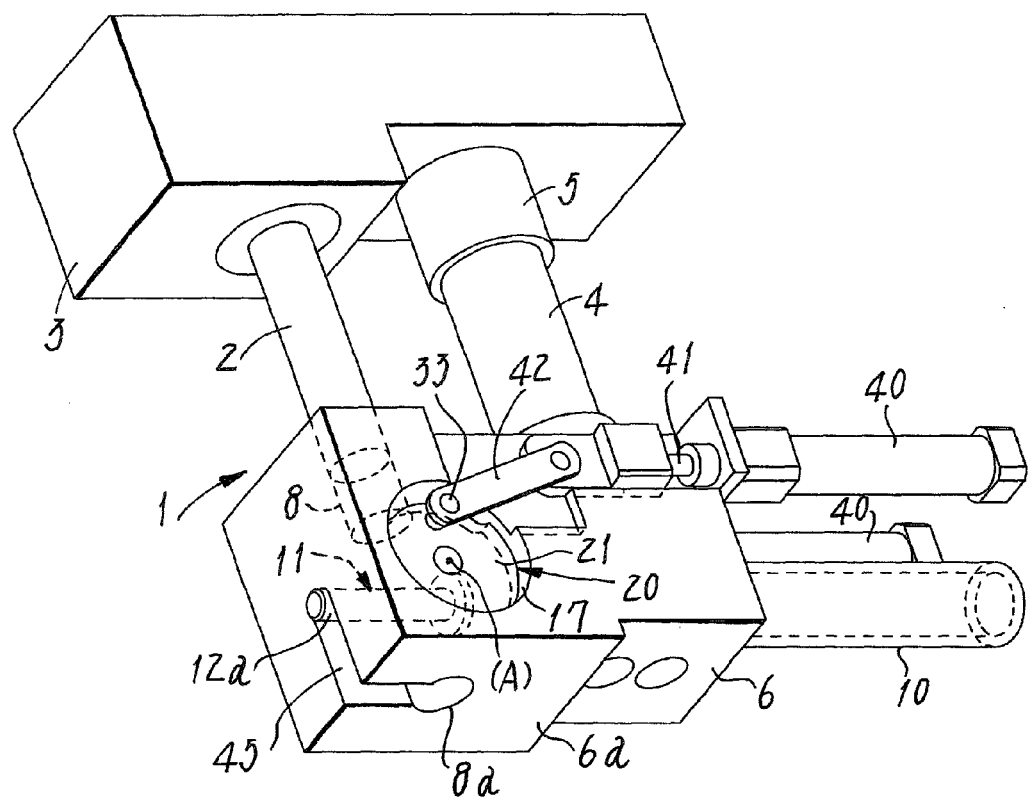
FIG. 22 is a partially cut-away perspective view showing an aligned supply state of fastening parts long in the shaft part by the apparatus for aligned supply of fastening parts of the present invention shown in FIG. 1.

As shown in FIG. 22, if the screw shaft part 12 of the clinch bolts 11 is too long, and projecting and protruding from the both disk-shaped gripping claws 21, 21 of the rotary holding claw body 20, the front end part of the slide guide 6 may be only provided with a notch passage 45 extending up to the lower end opening 8a of the through-hole 8 from the extending position of the supply passage 9 by penetrating through the through-hole 8 of the pressing punch 2, so that the protruding shaft part 12a of the screw shaft part 12 may be rotated and displaced by a specified angle (90 degrees) by way of the notch passage 45, so as to be movable into the lower end opening 8a of the through-hole 8, so that the aligned supply will not be disturbed.

In the foregoing preferred embodiment, the present invention is applied to an example of affixing the clinch bolts 11 to the metallic panel 51 by means of the pressing punch 2, but instead of the driver bit of the automatic screw fastening machine, the present invention may be applied to fastening of headed screws by replacing the pressing punch 2 with a driver bit of an automatic screw fastening machine.

In the preferred embodiment, the supply passage 9 is disposed in a horizontal direction orthogonal to the axial line of the pressing punch 2, but the supply passage 9 may be also disposed in a slightly oblique lateral direction to the axial line of the pressing punch 2. In this case, the specific angle of rotation and displacement of the both disk-shaped gripping claws 21, 21 is 90 degrees or less or 90 degrees or more, corresponding to the inclination angle of the supply passage 9 to the pressing punch 2.

DESCRIPTION OF THE REFERENCE NUMERALS AND SIGNS

1 Apparatus for aligned supply
2 Pressing punch (extruding bar)
3 Punch holder
4 Guide post
6 Slide guide
7 Coil spring (spring means)
8 Through-hole
8a Lowe end opening of through-hole 8
9 Supply passage
10 Supply hose
(A) Lateral axial line
11 Clinch bolt (fastening part)
12 Screw shaft part (shaft part)
12a Protruding shaft part
13 Head part
14 Crimping protrusion
15 Mounting hole
16 Central circular hole
17 Opening circular hole
18 Step part
20 Rotary holding claw body
21 Disk-shaped gripping claw
22 Disk-shaped main body
23 Opposite surface
24 Shaft part gripping groove
25 Taper body
26 Head part stopping step part
27 Stopper receiving concave part
28 Flange part
29 Cut-off part
30 Spring accommodating hole
31 Insertion hole
32 Stopper piece
33 Working shaft
40 Air cylinder (drive device)
41 Rod
42 Link
43 Stopping pin
44 Stopper pin
50 Crimping die
51 Metallic panel
52 Passing hole

PRIOR ART DOCUMENTS

Patent Documents

[Patent document 1] Patent Publication No. 3300688 (U.S. Pat. No. 6,357,109 B1)

The invention claimed is:

1. An apparatus for aligned supply of fastening parts for supplying fastening parts having a head part at one end of a shaft part to an automatic assembling machine, said apparatus comprising:

a supply passage configured to continuously supply the fastening parts in a position of lateral direction with the shaft part leading end ahead and the head part behind;

a rotary holding claw body configured to position and hold the fastening parts supplied by way of the supply passage;

a pressing punch disposed above the rotary holding claw body and configured to press the head part of the fastening parts by moving up and down relative to the rotary holding claw body;

a first axial line which passes through an intersection of an axial line of the pressing punch and an axial line of the supply passage and which is orthogonal to the axial lines of the pressing punch and the supply passage;

wherein the rotary holding claw body includes a pair of mutually opposing disk-shaped gripping claws forced to press against each other by push springs acting parallel to the first axial line, and is configured to rotate by a specific angle about the first axial line; wherein the disk-shaped gripping claws are oriented so that the plane of the disk-shaped portion is always parallel to the axial lines of the pressing punch and the supply passage;

wherein the rotary holding claw body is configured to rotate while gripping, between the pair of disk-shaped gripping claws, the fastening parts supplied in a position of lateral direction from the supply passage, so that the fastening parts are in a position of longitudinal direction with the head part of the fastening parts upward, and to position and hold the rotated fastening parts coaxially with the pressing punch; and wherein when the pressing punch descends and presses the head part of the fastening parts, the disk-shaped gripping claws are configured to push and expand parallel to the first axial line so that the fastening parts are pushed out from between the disk-shaped gripping claws.

2. The apparatus for aligned supply of fastening parts according to claim 1, further comprising:

a punch holder configured to fixedly hold the pressing punch;

a guide post configured to move up and down relative to the punch holder by a specific distance parallel to the axial line of the pressing punch; and a slide guide fixed on the guide post;

wherein the guide post and the slide guide are configured to be forced downward relative to the punch holder by spring means interposed between (i) the guide post the slide guide and the (ii) punch holder;

wherein the slide guide is provided with a through-hole in which the pressing punch is inserted, and with the supply passage and the rotary holding claw body disposed where the through hole crosses the supply passage so that the rotary holding claw body is rotatable by a specific angle bout the first axial line.

3. The apparatus for aligned supply of fastening parts according to claim 2, wherein the pair of mutually opposing disk-shaped gripping claws of the rotary holding claw body are provided with:

shaft part gripping grooves of an arc-shaped section for engaging and gripping the shaft parts of the fastening parts on mutually opposite sides;

taper grooves outwardly expanding continuously to the end parts of the shaft part gripping grooves, and head part stopped step parts formed at the end parts of the taper grooves for stopping the head parts, stopper piece receiving concave parts extending parallel to the shaft part gripping grooves, and opened to a peripheral side surface and mutually contacting surfaces, and flange parts extending along the outer peripheral edges of both disk-shaped gripping claws;

wherein accommodating holes of the push springs are provided in the center of the outer side of both disk-shaped gripping claws; and wherein both disk-shaped gripping claws are provided with through-holes for working shaft penetrating and extending parallel to the lateral axial line; and wherein mounting holes of both disk-shaped gripping claws provided in the slide guide are orthogonal to the through-hole in which the pressing punch penetrates, with the lateral first axial line provided in the center of rotation; and wherein the mounting holes are composed of:

central circular holes sliding and bonding with the peripheral surface of both mutually opposite disk-shaped gripping claws, and opening circular holes of a larger diameter than the central circular holes sliding and bonding with the outer circumference of the flange parts, being disposed consecutively to both sides of the central circular hole; and wherein when both disk-shaped gripping claws are assembled in the mounting holes in the mutually opposite positions, the peripheral surfaces of both disk-shaped gripping claws are rotatably supported on the central circular holes about the lateral axial line, the pair of flange parts are bonded to the opening circular holes slidably, and are stopped in step parts formed at the border of the central circular holes and the opening circular holes, both disk-shaped gripping claws are prevented from moving in the inward direction, but are allowed to move in the outward direction, and both disk-shaped gripping claws are forced to push and contact with each other by the push springs inserted in the spring accommodating holes provided on the outside of both disk-shaped gripping claws, and stopper pieces are fitted movably and freely along both stopper piece receiving concave parts;

wherein while the working shaft contained in both through-holes is driven and coupled to drive devices installed in the slide guide, so that both disk-shaped gripping claws are rotated and displaced by a specific angle about the lateral axial line by the working shaft.

4. The apparatus for aligned supply of fastening parts according to claim 3, wherein cut-off parts are provided in an angle range corresponding to rotation of the specific angle in the pair of flange parts of both disk-shaped gripping claws, and when stopping pins inserted into the slide guide from a lateral direction are engaged with the cut-off parts, both disk-shaped gripping claws are rotated and displaced correctly by the specific angle.

5. The apparatus for aligned supply of fastening parts according to claim 4, wherein stopper pins inserted in the slide guide and protruding into both opening circular holes of the mounting holes are engaged tightly with the outer side of the pair of flange parts of both disk-shaped gripping claws to prevent both disk-shaped gripping claws from moving to an outward direction, and when the stopper pins are opposite to the cut-off parts of the pair of flange parts, both disk-shaped gripping claws are allowed to move to an outward direction.

6. The apparatus for aligned supply of fastening parts according to claim 3, wherein the leading end part of the slide guide is provided with a notch passage in which the pressing punch is inserted from the extending portion of the supply passage and penetrates through the through-hole moving up and down, and extends to an lower end opening; and wherein when the shaft part of the fastening parts gripped by both disk-shaped gripping claws is long, and protrudes from the shaft part gripping grooves, the protruding shaft part passes through the notch passage along with rotation and displacement of both disk-shaped gripping claws, and is movable up to the lower end opening of the through-hole.

7. The apparatus for aligned supply of fastening parts according to claim 4, wherein the leading end part of the slide guide is provided with a notch passage in which the pressing punch is inserted from the extending portion of the supply passage and penetrates through the through-hole moving up and down, and extends to an lower end opening; and wherein when the shaft part of the fastening parts gripped by both disk-shaped gripping claws is long, and protrudes from the shaft part gripping grooves, the protruding shaft part passes through the notch passage along with rotation and displacement of both disk-shaped gripping claws, and is movable up to the lower end opening of the through-hole.

8. The apparatus for aligned supply of fastening parts according to claim 5, wherein the leading end part of the slide guide is provided with a notch passage in which the pressing punch is inserted from the extending portion of the supply passage and penetrates through the through-hole moving up and down, and extends to an lower end opening; and wherein when the shaft part of the fastening parts gripped by both disk-shaped gripping claws is long, and protrudes from the shaft part gripping grooves, the protruding shaft part passes through the notch passage along with rotation and displacement of both disk-shaped gripping claws, and is movable up to the lower end opening of the through-hole.

* * * * *